United States Patent Office.

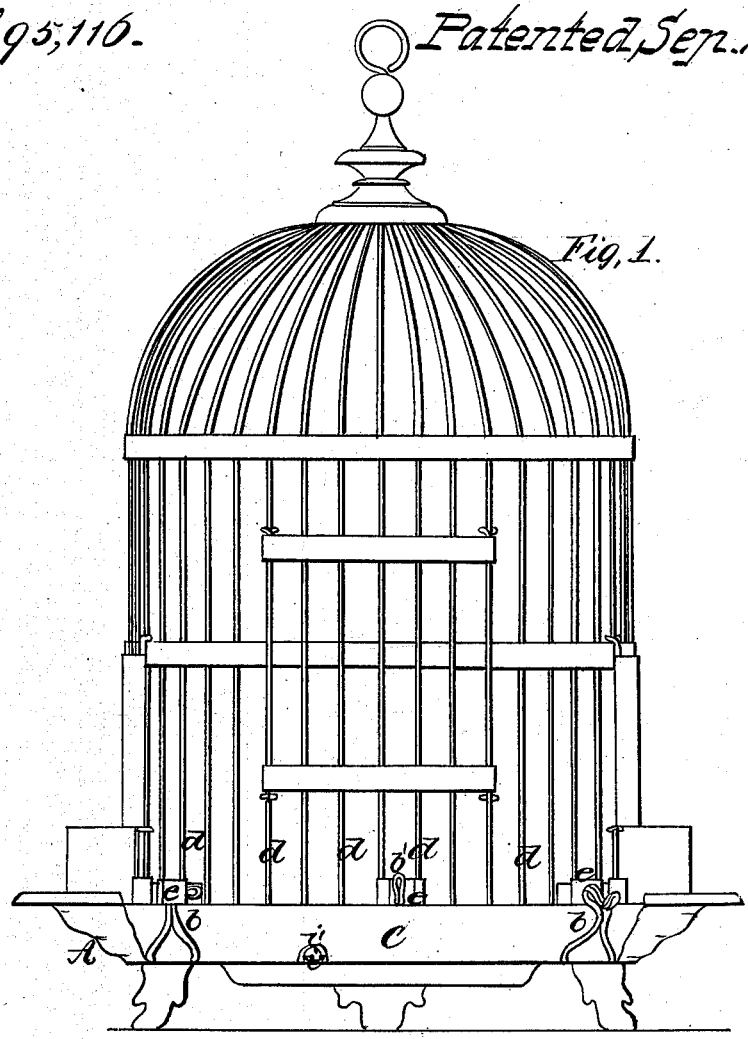
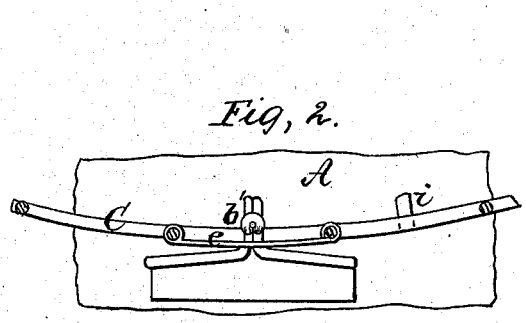
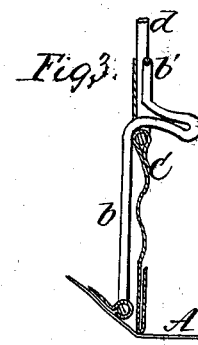

JOHN C. JEWETT AND JOHN VOGT, OF BUFFALO, NEW YORK; SAID VOGT ASSIGNS HIS RIGHT TO SAID JEWETT.

Letters Patent No. 95,116, dated September 21, 1869.

---

IMPROVED BIRD-CAGE.

---

The Schedule referred to in these Letters Patent and making part of the same.

---

We, JOHN C. JEWETT and JOHN VOGT, of the city of Buffalo, county of Erie, and State of New York, have invented certain new and useful Improvements in Bird-Cages, of which the following is a specification.

The improvements relate to the manner of securing the bottom to the cage, and more particularly to that kind of cages to which the bottom is secured in place by means of hooks which engage over the base-band of the cage.

This device although simple, and the common method of attachment in use, is defective on account of the liability of the bottom to become accidentally detached, when the cage is handled or hung, so as to be subjected to jarring.

The nature of our invention consists—

First, in the employment, in connection with these hooks, of a guard in the shape of a slide, attached to a couple of vertical wires of the cage, which slides outside of the upper portion of the hook, so as to prevent its accidental disengagement.

Second, of a raised ledge, fastened to the bottom, under the edge of the cage, which so elevates the latter as to prevent the engagement of the hooks over the base-band until the cage is arranged so as to bring the slides in proper position to engage with the hooks, when a notch, formed in the edge of the base-band corresponding with the ledge, permits the cage to settle and the hooks to be engaged, thereby preventing careless servants from engaging the hooks over the base-band between wires that are not provided with our improved guard, which is made to automatically descend in locking the hooks in place.

In the accompanying drawings—

Figure I is a view in elevation of a cage, with a portion of the bottom broken away, to expose the hooks which secure the latter to the cage.

Figure II is a detached fragmentary view, showing a plan of one of the hooks secured by our improved guard.

Figure III is a vertical section of the same.

Like letters of reference designate like parts in each of the figures.

A is the bottom of the cage;

$b\ b$, the hooks attached thereto, having an upwardly-projecting stem, $b'$;

C, the base-band of the cage;

$d\ d$, the vertical wires thereof; and $e$, our improved guard, consisting of a small strip of metal, connecting the vertical wires between which the hooks engage with the band.

These guards are loosely attached to the wires, so that they will fall by their own gravity, and lock the hooks after the latter have been engaged over the base-band.

$i$ is the ledge, soldered or otherwise attached to the bottom of the cage, and $i'$ the corresponding notch in the lower edge of the base-band. When the cage is properly arranged, so as to bring the hooks and slides in juxtaposition, and then only, will this notch and ledge coincide, and permit the engagement of the hooks.

The bottom being attached to the cage by elevating the slides and engaging the hooks over the band, in the usual manner, the slides will descend by their own gravity and fasten the hooks in place.

It will thus be readily perceived that our improvements not only prevent the accidental disengagement of the hooks, but are so arranged that the bottom cannot be attached without our improved guard automatically operating to lock the fastening.

What we claim as our invention, is—

1. The sliding guard $e$, arranged and operating with the hook $b$, provided with stem $b'$, substantially as hereinbefore set forth.

2. In combination therewith, the ledge and notch $i$ and $i'$, arranged and operating as set forth.

JNO. C. JEWETT.
JOHN VOGT.

Witnesses:
JAY HYATT,
JNO. J. BONNER.